July 5, 1966   W. D. ALLISON   3,259,201
LINKAGE TYPE REAR SUSPENSION SYSTEM FOR A MOTOR VEHICLE
Filed Dec. 18, 1964   3 Sheets-Sheet 3
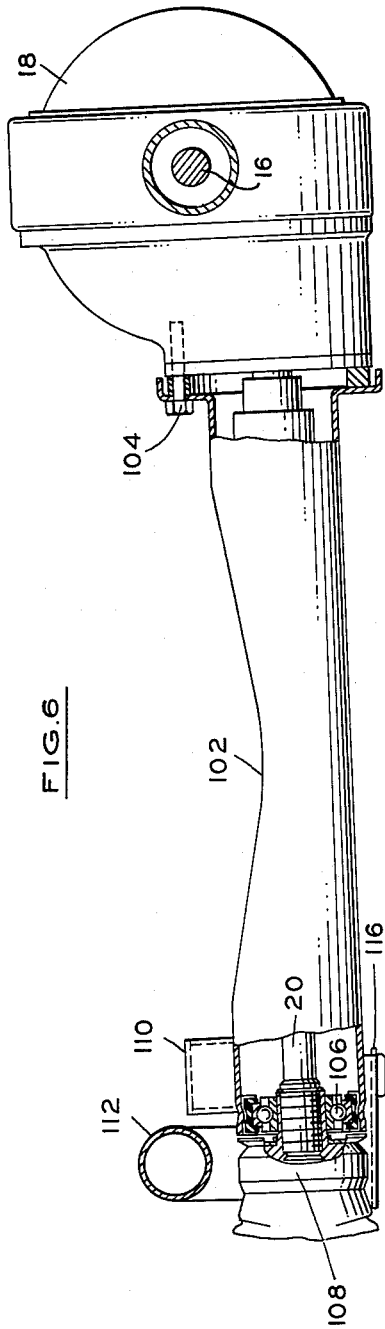
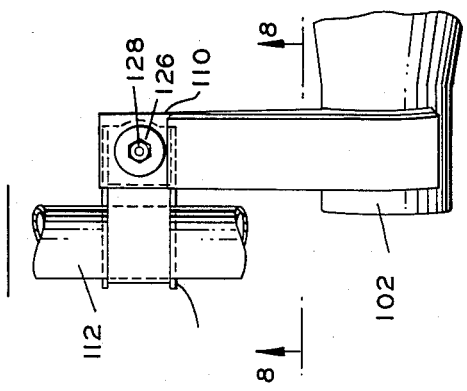
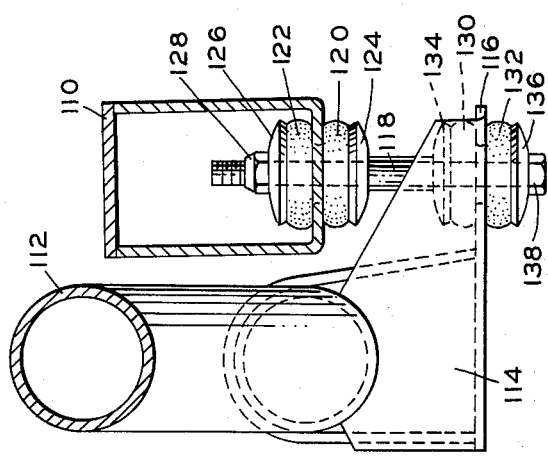
WILLIAM D. ALLISON
INVENTOR
BY John R. Faulkner
Clifford L. Sadler
ATTORNEYS United States Patent Office
3,259,201
Patented July 5, 1966

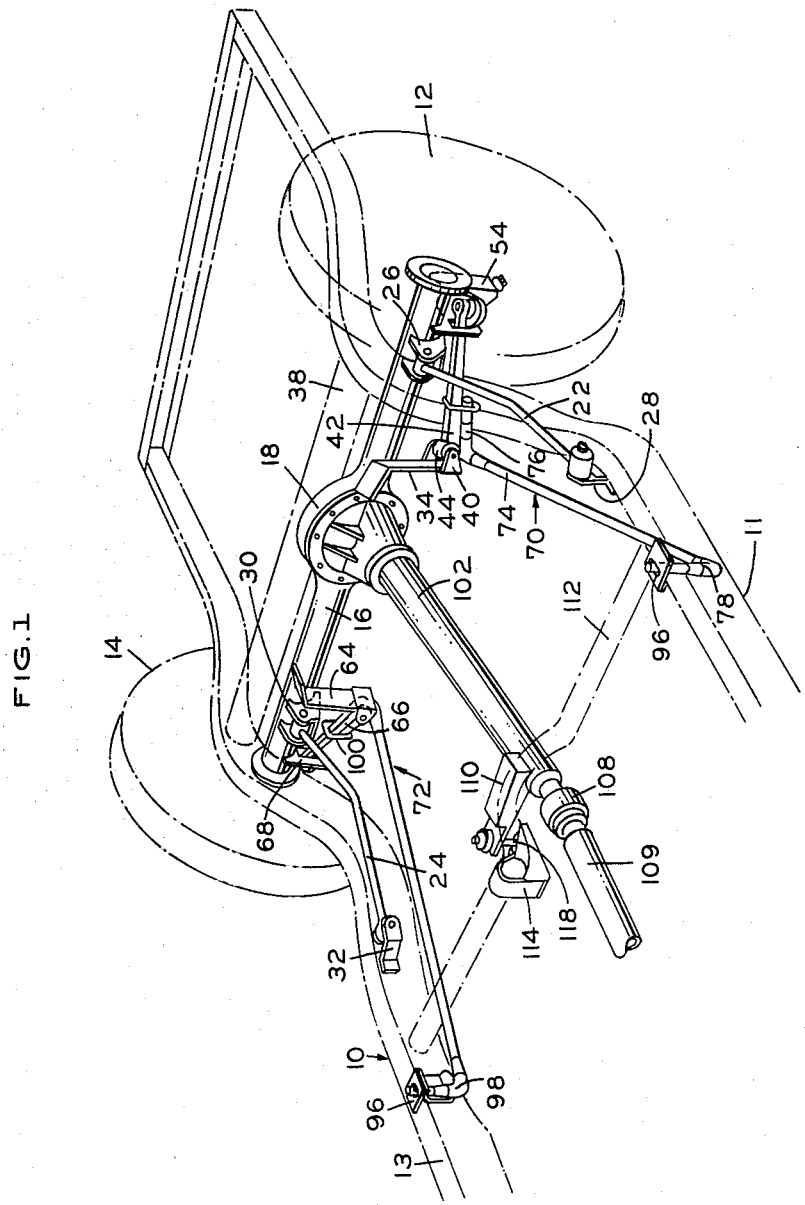

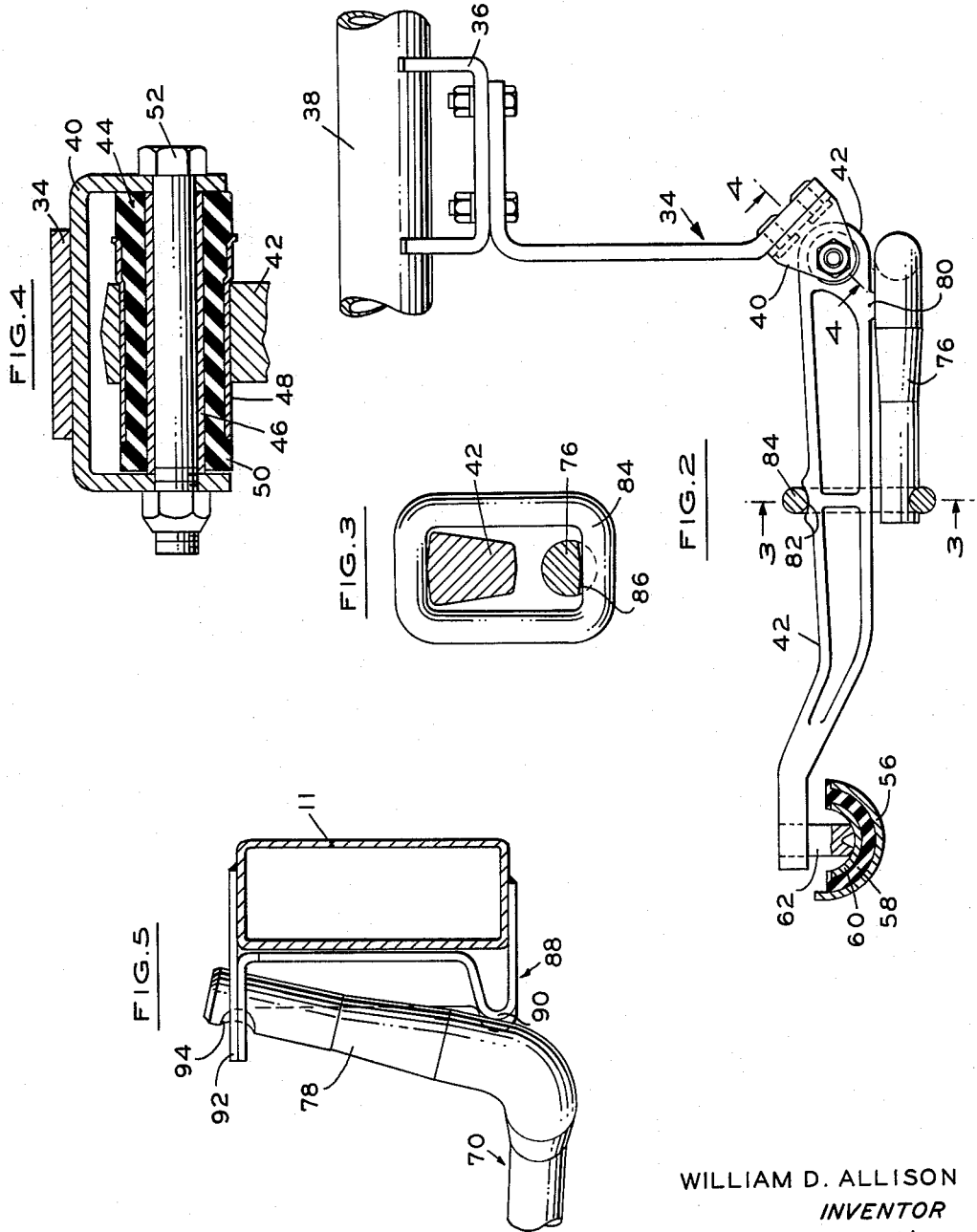

3,259,201
LINKAGE TYPE REAR SUSPENSION SYSTEM
FOR A MOTOR VEHICLE
William D. Allison, Grosse Pointe Farms, Mich., assignor to Ford Motor Company, Dearborn, Mich., a corporation of Delaware
Filed Dec. 18, 1964, Ser. No. 419,482
12 Claims. (Cl. 180—73)

The present invention is generally related to rear suspension systems for motor vehicles, and more particularly to a rear suspension system of the linkage type.

It is the basic object of any motor vehicle suspension system to resiliently support the vehicle body upon the wheels and to isolate the road irregularities from the passenger compartment. In addition, a superior vehicle suspension system should provide a soft boulevard ride, have good road holding qualities while cornering, and isolate noise and vibration from the vehicle body.

These features are not always compatible. In a conventional suspension structure, a soft ride usually leads to instability at high vehicle speeds or loss of precise cornering control. Similarly, a suspension system having exceptional vehicle control characteristics is usually accompanied by a hard ride.

Therefore, it is the principal object of the present invention to provide a superior vehicle suspension system of the linkage type which combines these desirable operating characteristics.

It is a further object of the present invention to provide a rear suspension system that is so arranged that when a side force is applied to the sprung mass, the rear of the vehicle is displaced sideways relative to the rear axle. This lateral displacement is know in the art as lateral compliance. Lateral compliance is desirable because it reduces ride harshness and side shake.

It is another object of the present invention to provide a pair of suspension arms or links that extends forwardly and outwardly in a diverging relationship from the vehicle axle housing to their attachment with the body so that lateral compliance of the body is accomplished by a canting of the axle in the direction of understeer.

It is still another object of the present invention to provide a torque tube which interconnects the axle housing and the vehicle body. In accordance with the preferred embodiment of the present invention, the torque tube is rigidly connected at its rear end to the differential housing and at its front end to a frame member by means of an articulated link. The torque tube prevents rotation of the axle housing during acceleration and breaking. In a suspension of the prevent invention, the torque reaction is handled solely by the torque tube and is isolated from the suspension links.

It is another object of the present invention to connect the forward end of the torque tube to the vehicle body by a shackle device so that the torque tube cannot be loaded in either compression or tension during acceleration and braking. The diverging suspension links carry all of the braking and accelerating forces while the torque tube acts as the sole torque reaction member to prevent rotation of the axle housing.

The many objects and advantages of the present invention will become amply apparent from the following description and the accompanying drawing, in which:

FIGURE 1 is a perspective view of a link type rear suspension system for a motor vehicle constructed in accordance with this invention;

FIGURE 2 is a rear elevational view of a portion of the linkage system of FIGURE 1;

FIGURE 3 is a sectional view taken along section lines 3—3 of FIGURE 2;

FIGURE 4 is a sectional view taken along section lines 4—4 of FIGURE 2;

FIGURE 5 is a front elevational view showing a connection of the torsion bar with the vehicle frame;

FIGURE 6 is a side elevational view of the differential, torque tube and related structure;

FIGURE 7 is a top plan view of the connection of the torque tube with the vehicle frame; and FIGURE 8 is a sectional view taken along section lines 7—7 of FIGURE 6.

Referring now to the drawings for a more comprehensive understanding of this invention, FIGURE 1 illustrates a vehicle suspension having a chassis frame 10 that is supported upon a pair of left and right road wheels 12 and 14 by means of an improved suspension system. Frame 10 includes left and right side rails 11 and 13.

The wheels 12 and 14 are situated at the outer ends of an axle housing 16 which has a differential unit 18 disposed at its mid-point. The differential gear unit receives power from an engine by means of a drive shaft 20 and transmits driving torque to the wheels 12 and 14 through axle shafts contained within the axle housing 16.

The axle housing 16 is located longitudinally with respect to the vehicle chassis 10 by means of left and right suspension arms 22 and 24. A bracket 26 is welded to the outer end of the axle housing 16 inwardly of the wheel 12. A left suspension link 22 is pivotally connected to the bracket 26 at its rear end. The forward end of the link or arm 22 is pivotally connected to a bracket 28 which is secured to the side rail 11 of the vehicle frame 10. Similarly, a bracket 30 is welded to the right outer end of axle housing 16. Bracket 30 pivotally supports the rear end of the suspension link 24. The forward end of the link 24 is pivotally connected to a frame bracket 32 that is welded to the right frame rail 13. The suspension links 22 and 24 are inclined in both the plan and elevational views. In the elevational view, the arms or links 22 and 24 extend downwardly and forwardly. In the plan view, the links extend outwardly and forwardly in a diverging fashion.

Suspension means are provided to position the axle housing 16 laterally with respect to frame 10. Such means comprise a left spring link 34 which has its upper end rigidly bolted to a frame bracket 36. The bracket 36 is welded to a tubular cross frame member 38 that interconnects the left and right side rails 11 and 13 of the frame 10. The spring link 34 is formed of leaf spring material and is resilient in a lateral direction.

The lower end of the link 34 has a U-shaped bracket 40 secured to it. A laterally extending suspension arm 42 is pivotally connected to the bracket 40 of the link 34 by means of a resilient bushing assembly 44. The bushing assembly 44 comprises an inner sleeve 46 and an outer sleeve 48 that is separated by a rubber layer 50. The inner sleeve 46 is connected to the bracket 40 by means of a bolt 52. The outer sleeve 48 is connected to the lateral arm 42. The pivot bushing 44 permits the arm 42 to traverse a vertical jounce and rebound path.

A bracket 54 is welded to the outer end of the axle housing 16 adjacent to the wheel 12. This bracket is pivotally connected to the outer end of the lateral arm 42. The bracket 54 is provided with a cup-shaped portion 56 which receives a cup-shaped rubber layer 58 and a second cup-shaped metal piece 60 that rides on top of the rubber layer 58. The outer end of the arm 42 has a depending rod portion 62 that is seated in the upper cup-shaped metal piece 60. This connection operates in the fashion of a ball and socket joint between the lateral suspension arm 42 and the axle housing 16. The rubber layer permits movement between the components and isolates noise and vibration to the axle housing that might otherwise be transmitted to the vehicle chassis through the arm 42 and spring link 34.

The foregoing description presents the construction of the left-hand end of the axle housing. Similarly, a lateral link is provided to connect the right-hand end of the axle housing 16 with the frame 10. As seen in FIGURE 1, this construction includes a vertically extending laterally resilient leaf spring link 64 that is rigidly connected to the transverse tubular frame member 34 at its upper end and pivotally connected to a lateral arm 66 at its lower end. The outer end of the arm 66 is connected to an axle housing bracket 68 by means of a modified ball and socket joint of the type illustrated in FIGURE 2.

The lateral suspension arms 42 and 66 together with the vertical spring links 34 and 64 position the axle housing 16 laterally with respect to the vehicle chassis. Due to the presence of the spring metal links 34 and 64 and the fact that they are laterally resilient, the vehicle body and chassis are free to move transversely in response to a lateral force. The resiliency of the links 34 and 64 resist such lateral displacement.

In accordance with the present invention, means are provided for resiliently supporting the vehicle chassis 10 upon the axle housing 16. In this invention, such means include left and right torsion bars 70 and 72. The torsion bar 70 has a straight elongated torsional segment 74 with a rear angled end portion 76 extends in a lateral direction from the main torsional portion 74. The forward end of the torsional segment 74 is connected integrally with a vertically extending angled end portion 78.

The rear angled end portion 76 of the suspension torsion bar 70 is connected to the lateral suspension arm 42 and extends in a direction generally parallel thereto. The arm 42 is provided with a protrudence 80 which constitutes a fulcrum and against which the angled end portion 76 rests. The upper surface of the mid-portion of the lateral arm 42 is provided with a saddle-shaped portion 82 that receives a rectangular-shaped ring 84. The outer end or tip of the angled end portion 76 of the torsion bar 70 is provided with a notch 86 which receives the ring 84. Because the torsion bar 70 is prestressed to support the vehicle chassis 10 upon the axle 16, the ring 84 is loaded in tension and tends to hold the torsion bar end 76 in engagement with the fulcrum 80.

The left side rail 11 of the frame 10 has a bracket 88 welded to it which provides a support for the forward angled end 78 of the torsion bar 70. The bracket 88 has an inwardly directed flange portion 90 formed of double-over sheet metal. The flange 90 forms a fulcrum for the torsion bar end 78. An upper flange 92 is also formed of the sheet metal of bracket 88. The flange 92 is provided with an opening through which the tip of the torsion bar end 78 extends. The tip of the bar is provided with a notch 94 similar to the notch 86 of the rear angled end 76. The notch 94 engages the edge of the opening in the flange 92. The opening may be seen in FIGURE 1 where it is identified by the reference numeral 96.

The edge of the opening 96 that is engaged by the notch 94 is in direct vertical alignment with the fulcrum edge of the flange 90. Because the arm 42 is supported by the spring link 34, it may move laterally with respect to the chassis frame 10. When the arm 42 moves laterally, the torsion bar 70 is pulled with it. Due to the vertical alignment of the fulcrum 90 and the notch 94, the end 78 of the torsion bar 70 pivots about a vertical axis upon lateral movement of the arm 42.

The foregoing description describes the construction and connection of the left-hand torsion bar 70. The right-hand bar 72 is similarly connected. A bracket 96 is welded to the right frame side rail 10 and supports the angled end 98 of the torsion bar 72 in the fashion of the construction illustrated in FIGURE 5. A rear angled end of the torsion bar 72 is also provided and is connected to the lateral suspension arm 66 by means of a fulcrum point and a retaining ring 100. This construction is similar to that illustrated in FIGURES 2 and 3 which was described in connection with the left-hand torsion bar 70.

As previously stated, the torsion bars 70 and 72 are prestressed so that the vehicle body and chassis 10 are supported upon the wheels 12 and 14 with an appropriate spacing between the axle housing 16 and the frame side rails 11 and 13.

Suspension means are provided to prevent rotation of the axle housing when torque is being transmitted to the wheels 12 and 14. In accordance with the present invention, such means comprise a torque tube 102 that is connected to the nose of the differential 18 by means of circumferentially spaced apart bolts 104. The tube 102 contains the drive shaft 20 and rotatably supports the drive shaft 20 at its forward end by means of a ball bearing 106. A universal joint 108 connects the forward end of the shaft 20 with a second shaft 109 of the drive shaft assembly.

An arm 110 is welded to the torque tube 102 near its forward end and extends laterally therefrom in a right-hand direction. A tubular cross frame member 112 is situated just forwardly of the lateral arm 110 and rigidly interconnects the left and right side rails 11 and 13 of the frame assembly 10.

A bracket 114 is secured to the frame cross member 112 and has a rearwardly extending portion 116. An articulated link 118 interconnects the extending portion 116 and the outer end of the lateral arm 110. The upper end of the link 118 is connected to the arm 110 by means of a pair of spaced apart rubber bushings 120 and 122 that is located on either side of the sheet metal from which the arm 110 is formed. A pair of washers 124 and 126 completes the assembly and is held in place by a nut 128. In a similar fashion, the lower end of the link 118 is connected to the bracket portion 116 by means of spaced apart rubber bushings 130 and 132 which, in connection with washers 134 and 136, are held in place by the head 138 of the bolt which forms the body of the link 118. The connection at either end of the bolt 118 permits universal movement and constitutes an articulated connection.

The torque tube 102 is provided to prevent rotation of the axle housing 16 by transmitting torque reaction caused by acceleration and braking to the frame element 112. Longitudinal forces are not carried by the torque tube 102 due to the presence of the shackle connection 118. This connection permits the torque tube 102 to move in a fore and aft direction relative to the frame cross member 112. The pinion shaft angle of the differential gear unit 18 is also controlled by the torque tube 112.

The rear suspension system described above is arranged so that when a side force is applied to the sprung mass, the rear of the vehicle body is displaced sideways relative to the rear axle housing 16. This lateral displacement is permitted by the resilient flexibility of the spring metal links 34 and 64 which interconnect the axle housing 16 and the frame 10. Since the front of the body does not move laterally, the body undergoes angular rotation about a vertical axis through the center of the front tread. Each point on the sprung mass rotates about this vertical axis in proportion to its distance from the axis and the amount of lateral displacement or compliance at the rear suspension.

The lateral displacement of the sprung mass at the rear is utilized to effect a steering movement of the axle 16 in a direction to oppose the side force. The steering of the rear axle 16 is accomplished by the angular placement of the two suspension links 22 and 24 connecting the axle housing 16 to the frame 10. As the frame pivot supports 28 and 32 of the suspension arms 22 and 24 rotate around the vertical front axis, the pivot on one side of the vehicle moves forwardly and out the opposite pivot moves in and rearwardly relative to the center of the rear axle housing 16. The fixed length of the suspension arms 22 and 24 imparts a steering movement to the rear axle housing 16 according to the spacing and angular position of the arms or links 22 and 24.

Inasmuch as the steering movement applied to the rear axle housing 16 is in the direction to oppose the side force, it is considered to be in the direction of understeer. The understeering produced by lateral compliance is proportional to the lateral force and is not appreciably effective by vehicle ride height in contrast to the pronounced effect of ride height on the rear axle steer produced by body roll. Because the arms 22 and 24 extend downwardly as well as outwardly, roll understeer is also provided.

It will be noted from the drawings that the suspension links 22 and 24 are angled with respect to each other in a forwardly diverging direction. With this arrangement, side thrust understeer is provided. When the vehicle having the suspension in FIGURE 1 is executing a turn to the left, the vehicle frame and body will tend to shift to the right under the influence of centrifugal force. This lateral shift of the body to the right will be permitted due to the flexibility of the spring metal links 34 and 64. When the body and the frame 10 shifts to the right, the left-hand link 22 will becomes more generally parallel to the longitudinal axis of the vehicle. This will cause the left wheel 12 to move slightly rearwardly as the left link or arm 22 tends to straighten out in its direction. At the same time, the right link 24 will become arranged at a sharper angle to the axle housing 16 when the chassis shifts to the right. This movement of the right link 24 will tend to pull the right wheel 14 forwardly. Because the left wheel 12 is moved rearwardly and the right wheel 14 is moved forwardly, the wheels will tend to steer the vehicle out of the curve which produced the centrifugal force. This is known as understeer. Because the understeer is responside to a side force, it is called side thrust understeer. It is generally recognized by those skilled in the art that side thrust understeer increases the controllability of the vehicle during cornering. It generally provides an increased precision in steering.

In addition to providing a means of obtaining rear suspension understeer that is responsive to ride height, lateral compliance provides other benefits in the form of increased road holding on corners and the reduction of side shake. In a solid axle rear suspension system, individual movement of either rear wheel imparts a sideways thrust to the sprung mass. The application of lateral forces to the body produces noise, vibration and side shake. Lateral compliance or flexibility between the sprung mass and the rear axle permit the axle to follow road irregularities with a substantial reduction in the magnitude of lateral forces between the body and axle in comparison with the conventional rear suspension. The net effect on the body is a pronounced reduction in noise, vibration and harshness. The net effect on the axle is a greatly increased traction on corners due to the diminished side forces applied to the tires.

The torque tube 102 is connected at its forward end to the frame member 112 by means which permit the lateral movement between the frame 10 and the axle housing 16. The shackle connection 118 permits the ends of the axle housing 16 to move forwardly or rearwardly as dictated by the side thrust understeer geometry of the suspension. The shackle 118 transfers brake and acceleration reaction torque which tends to rotate the axle housing 16 to the frame 10 and thus, permits the torque tube 102 to function as a torque arm. The longitudinal forces on the axle housing 16 that are caused by acceleration and braking are handled by the suspension links 22 and 24. Because the shackle 118 permits unrestricted longitudinal movement of the torque tube 102, these forces are not carried by that suspension element.

The foregoing description constitutes the presently preferred embodiment of this invention. Modifications and alterations may occur to those skilled in the art that will come within the scope and spirit of the following claims.

I claim:

1. A vehicle suspension system including a vehicle frame, an axle housing, a pair of road wheels situated at the outer ends of said axle housing, suspension means interconnecting said frame and said axle housing, said suspension means comprising a pair of suspension links, each of said links having one end pivotally connected to said axle housing and the other end pivotally connected to said frame, laterally resilient means interconnecting said frame and said axle housing and constructed to position said axle housing laterally with respect to the longitudinal center line of said vehicle frame, a torque reaction means constructed to resist rotation of said axle housing, said torque reaction means comprising a tube having its rear end rigidly secured to said axle housing and extending forwardly therefrom, shackle means interconnecting the other end of said tube and said frame, said shackle means being constructed to prevent the rotation of said torque tube about the axis of said axle housing while permitting fore and aft movement of said torque tube.

2. A vehicle suspension system including a vehicle frame, an axle housing, a pair of road wheels situated at the outer ends of said axle housing, suspension means interconnecting said frame and said axle housing, said suspension means comprising a pair of suspension links, each of said links having one end pivotally connected to said axle housing and the other end pivotally connected to said frame, laterally resilient means interconnecting said frame and said axle housing and constructed to position said axle housing laterally with respect to the longitudinal center line of said vehicle frame, a torque reaction means constructed to resist rotation of said axle housing, said torque reaction means comprising a tube having its rear end rigidly secured to said axle housing and extending forwardly therefrom, shackle means interconnecting the other end of said tube and said frame, said shackle means being constructed to prevent the rotation of said torque tube about the axis of said axle housing while permitting fore and aft movement of said torque tube, said suspension links being angled forwardly and outwardly in a diverging fashion with respect to a vertical plane containing the longitudinal center line of said vehicle, said suspension means permitting said vehicle frame to move laterally with respect to said axle housing whereby one end of said axle housing is moved forwardly and the other end of said axle housing is moved rearwardly to provide an understeer effect.

3. A vehicle suspension system including a vehicle frame, an axle housing, a pair of road wheels situated at the outer ends of said axle housing, suspension means interconnecting said frame and said axle housing, said suspension means comprising a pair of suspension links, each of said links having one end pivotally connected to said axle housing and the other end pivotally connected to said frame, laterally resilient means interconnecting said frame and said axle housing and constructed to position said axle housing laterally with respect to the longitudinal center line of said vehicle frame, a pair of torsion bars each having an end portion connected to said laterally resilient means and another portion connected to said frame, a torque reaction means constructed to resist rotation of said axle housing, said torque reaction means comprising a tube having its rear end rigidly secured to said axle housing and extending forwardly therefrom, shackle means interconnecting the other end of said tube and said frame, said shackle means being adapted to prevent the rotation of said torque tube about the axis of said axle housing while permitting fore and aft movement of said torque tube, said suspension links being angled forwardly and outwardly in a diverging fashion with respect to a vertical plane containing the longitudinal center line of said vehicle, said suspension means permitting said vehicle frame to move laterally with respect to said axle housing whereby one end of said axle housing is moved forwardly and the other end of said axle housing is moved rearwardly to provide an understeer effect.

4. A vehicle suspension system including a vehicle frame, an axle housing, a pair of road wheels situated at the outer ends of said axle housing, suspension means interconnecting said frame and said axle housing, said suspension means comprising a pair of suspension links, each of said links having one end pivotally connected to said axle housing and the other end pivotally connected to said frame, laterally resilient means interconnecting said frame and said axle housing and constructed to position said axle housing laterally with respect to the longitudinal center line of said vehicle frame, a pair of torsion bars each having an end portion connected to said laterally resilient means and another portion connected to said frame, a torque reaction means constructed to resist rotation of said axle housing, said torque reaction means comprising a tube having its rear end rigidly secured to said axle housing and extending forwardly therefrom, shackle means interconnecting the other end of said tube and said frame, said shackle means being adapted to prevent the rotation of said torque tube about the axis of said axle housing while permitting fore and aft movement of said torque tube.

5. A vehicle suspension system including a vehicle frame, an axle housing, a pair of road wheels situated at the outer ends of said axle housing, suspension means interconnecting said frame and said axle housing, said suspension means comprising a pair of suspension links, each of said links having one end pivotally connected to said axle housing and the other end pivotally connected to said frame, laterally resilient means interconnecting said frame and said axle housing and constructed to position said axle housing laterally with respect to the longitudinal center line of said vehicle frame, said laterally resilient means comprising a pair of vertically arranged laterally resilient spring links, said links having their upper ends rigidly connected to said frame, a pair of suspension arms pivotally connected to said links and extending laterally outwardly therefrom, means connecting the outer ends of said lateral arms with said axle housing, a pair of tension bars each having a portion connected to said laterally extending suspension arm and another portion connected to said frame, a torque reaction means constructed to resists rotation of said axle housing.

6. A vehicle suspension system including a vehicle frame, an axle housing, a pair of road wheels situated at the outer ends of said axle housing, suspension means interconnecting said frame and said axle housing, said suspension means comprising a pair of suspension links, each of said links having one end pivotally connected to said axle housing and the other end pivotally connected to said frame, laterally resilient means interconnecting said frame and said axle housing and constructed to position said axle housing laterally with respect to the longitudinal center line of said vehicle frame, a pair of torsion bars each having an end portion connected to said laterally resilient means and another connected to said frame, a torque reaction means constructed to resist rotation of said axle housing, said suspension links being angled forwardly and outwardly in a diverging fashion with respect to a vertical plane containing the longitnudinal center line of said vehicle, said suspension means permitting said vehicle frame to move laterally with respect to said axle housing whereby one end of said axle housing is moved forwardly and the other end of said axle housing is moved rearwardly to provide an understeer effect.

7. A vehicle suspension system including a vehicle frame, an axle housing, a pair of road wheels situated at the outer ends of said axle housing, suspension means interconnecting said frame and said axle housing, said suspension means comprising a pair of suspension links, each of said links having one end pivotally connected to said axle housing and the other end pivotally connected to said frame, laterally resilient means interconnecting said frame and said axle housing and constructed to position said axle housing laterally with respect to the longitudinal center line of said vehicle frame, said laterally resilient means comprising a pair of vertically arranged laterally resilient spring links, said links having their upper ends rigidly connected to said frame, a pair of suspension arms pivotally connected to said links and extending laterally outwardly therefrom, means connecting the outer ends of said lateral arms with said axle housing, a pair of torsion bars each having a portion connected to said laterally extending suspension arm and another portion connected to said frame, a torque reaction means constructed to resist rotation of said axle housing, said suspension links being angled forwardly and outwardly in a diverging fashion with respect to a vertical plane containing the longitudinal center line of said vehicle, said suspension means permitting said vehicle frame to move laterally with respect to said axle housing whereby one end of said axle housing is moved forwardly and the other end of said axle housing is moved rearwardly to provide an understeer effect.

8. A vehicle suspension system including a vehicle frame, an axle housing, a pair of road wheels situated at the outer ends of said axle housing, suspension means interconnecting said frame and said axle housing, said suspension means comprising a pair of suspension links, each of said links having one end connected to said axle housing and the other end connected to said frame, laterally resilient means interconnecting said frame and said axle housing and constructed to position said axle housing laterally with respect to the longitudinal center line of said vehicle frame, said laterally resilient means comprising a pair of vertically arranged laterally resilient spring links, said links having their upper ends rigidly connected to said frame, a pair of suspension arms pivotally connected to said links and extending laterally outwardly therefrom, means connecting the outer ends of said lateral arms with said axle housing, a pair of torsion bars each having a torsional segment, a laterally extending right angled end portion and a vertically extending right angled end portion, said laterally extending leg portion being connected to said laterally extending suspension arm, said vertically extending leg portion being connected to said frame, said torsion bar being adapted to pivot about a substantially vertical axis at its connection with said frame, said suspension links being angled forwardly and outwardly in a diverging fashion with respect to a vertical plane containing the longitudinal center line of said vehicle, said suspension means permitting said vehicle frame to move laterally with respect to said axle housing whereby one end of said axle housing is moved forwardly and the other end of said axle housing is moved rearwardly to provide an understeer effect.

9. A vehicle suspension system including a vehicle frame, an axle housing, a pair of road wheels situated at the outer ends of said axle housing, suspension means interconnecting said frame and said axle housing, said suspension means comprising a pair of suspension links, each of said links having one end connected to said axle housing and the other end connected to said frame, laterally resilient means interconnecting said frame and said axle housing and constructed to position said axle housing laterally with respect to the longitudinal center line of said vehicle frame, said laterally resilient means comprising a pair of vertically arranged laterally resilient spring links, said links having their upper ends rigidly connected to said frame, a pair of suspension arms pivotally connected to said links and extending laterally outwardly therefrom, means connecting the outer ends of said lateral arms with said axle housing, a pair of torsion bars each having a torsional segment, a laterally extending right angled end portion and a vertically extending right angled end portion, said laterally extending leg portion being connected to said laterally extending suspension arm, said vertical extending leg portion being connected to said frame, a torque reaction means constructed to resist rotation of said axle housing, said suspension links being angled forwardly and outwardly in a diverging fashion with respect to a vertical plane containing the longitudinal center line of said vehicle, said suspension means permitting said vehicle frame to move laterally with respect to said axle housing whereby one end of said axle housing is moved forwardly and the other end of said axle housing is moved rearwardly to provide an understeer effect.

10. A vehicle suspension system including a vehicle frame, an axle housing, a pair of road wheels situated at the outer ends of said axle housing, suspension means interconnecting said frame and said axle housing, said suspension means comprising a pair of suspension links, each of said links having one end connected to said axle housing and the other end connected to said frame, laterally resilient means interconnecting said frame and said axle housing and constructed to position said axle housing laterally with respect to the longitudinal center line of said vehicle frame, said laterally resilient means comprising a pair of vertically arranged laterally resilient spring links, said links having their upper ends rigidly connected to said frame, a pair of suspension arms pivotally connected to said links and extending laterally outwardly therefrom, ball joint means connecting the outer ends of said lateral arms with said axle housing, a pair of torsion bars each having a torsional segment, a laterally extending right angled end portion and a vertically extending right angled end portion, said laterally extending leg portion being connected to said laterally extending suspension arm, said vertically extending leg portion being connected to said frame, said torsion bar being adapted to pivot about a substantially vertical axis at its connection with said frame, said suspension links being angled forwardly and outwardly in a diverging fashion with respect to a vertical plane containing the longitudinal center line of said vehicle, said suspension means permitting said vehicle frame to move laterally with respect to said axle housing whereby one end of said axle housing is moved forwardly and the other end of said axle housing is moved rearwardly to provide an understeer effect.

11. A vehicle suspension system including a vehicle frame, an axle housing, a pair of road wheels situated at the outer ends of said axle housing, suspension means interconnecting said frame and said axle housing, said suspension means comprising a pair of suspension links, each of said links having one end pivotally connected to said axle housing and the other end pivotally connected to said frame, laterally resilient means interconnecting said frame and said axle housing and constructed to position said axle housing laterally with respect to the longitudinal center line of said vehicle frame, said laterally resilient means comprising a pair of vertically arranged laterally resilient spring links, said links having their upper ends rigidly connected to said frame, a pair of suspension arms pivotally connected to said links and extending laterally outwardly therefrom, resilient ball joint means connecting the outer ends of said lateral arms with said axle housing, a pair of torsion bars each having a torsional segment, a laterally extending right angled end portion and a vertically extending right angled end portion, said laterally extending leg portion being connected to said laterally extending suspension arm, said vertically extending leg portion being connected to said frame, said torsion bar being constructed to pivot about a substantially vertical axis at its connection with said frame, a torque reaction means constructed to resist rotation of said axle housing, said torque reaction means comprising a tube having its rear end rigidly secured to said axle housing and extending forwardly therefrom, shackle means interconnecting the other end of said tube and said frame, said shackle means being constructed to prevent the rotation of said torque tube about the axis of said axle housing while permitting fore and aft movement of said torque tube, said suspension links being angled forwardly and outwardly in a diverging fashion with respect to a vertical plane containing the longitudinal center line of said vehicle, said suspension means permitting said vehicle frame to move laterally with respect to said axle housing whereby one end of said axle housing is moved forwardly and the other end of said axle housing is moved rearwardly to provide an understeer effect.

12. A vertical suspension system including a vehicle frame, an axle housing, a pair of road wheels situated at the outer ends of said axle housing, suspension means interconnecting said frame and said axle housing, said suspension means comprising a pair of suspension links, each of said links having one end pivotally connected to said axle housing and the other end pivotally connected to said frame, laterally resilient means interconnecting said frame and said axle housing and constructed to position said axle housing laterally with respect to the longitudinal center line of said vehicle frame, said laterally resilient means comprising a pair of vertically arranged laterally resilient spring links, said links having their supper ends rigidly connected to said frame, a pair of suspension arms pivotally connected to said links and extending laterally outwardly therefrom, resilient ball joint means connecting the outer ends of said lateral arms with said axle housing, said ball joint means comprising inner and outer metal cups, a rubber layer interposed between said cups, said suspension arms being connected to one of said cups and said axle housing being connected to the other of said cups, a pair of torsion bars each having a torsional segment, a laterally extending right angled end portion and a vertically extending right angled end portion, said laterally extending leg portion being connected to said laterally extending suspension arm, said vertically extending leg portion being connected to said frame, said torsion bar being adapted to pivot about a substantially vertical axis at its connection with said frame, a torque reaction means constructed to resist rotation of said axle housing, said torque reaction means comprising a tube having its rear end rigidly secured to said axle housing and extending forwardly therefrom, the forward end of said tube having a laterally extending arm, shackle means interconnecting the end of said laterally extending arm and said frame, said connection being adapted to prevent the rotation of said torque tube about the axis of said axle housing while permitting fore and aft movement of said torque tube, said suspension linke being angled forwardly and outwardly in a diverging fashion with respect to a vertical plane containing the longitudinal center line of said vehicle, said suspension means permitting said vehicle frame to move laterally with respect to said axle housing whereby one end of said axle housing is moved forwardly and the other end of said axle housing is moved rearwardly to provide an understeer effect.

References Cited by the Examiner

UNITED STATES PATENTS 3,037,789   6/1962   Allison _____ 280—124
3,149,689   9/1964   Adloff _____ 180—73 X

FOREIGN PATENTS 938,891   2/1956.   Germany.

LEO FRIAGLIA, *Primary Examiner.*

W. A. MARCONTELL, *Assistant Examiner.*